United States Patent [19]

Prudhon et al.

[11] 4,447,331
[45] May 8, 1984

[54] INTIMATE CONTACTING/SEPARATING OF PLURAL PHASES

[75] Inventors: Francois Prudhon, Versailles; Augustin Scicluna, Aubervilliers, both of France

[73] Assignee: Rhone-Poulenc Industries, Paris, France

[21] Appl. No.: 304,938

[22] Filed: Sep. 23, 1981

[30] Foreign Application Priority Data

Sep. 24, 1980 [FR] France ................................ 80 20464

[51] Int. Cl.³ ............................................. C02F 1/58
[52] U.S. Cl. .................................... 210/721; 210/737; 210/754
[58] Field of Search ............... 210/721, 758, 766, 928, 210/737, 724, 738, 754; 55/236

[56] References Cited

U.S. PATENT DOCUMENTS

| | | | |
|---|---|---|---|
| 3,177,634 | 4/1965 | Latham et al. | 55/236 |
| 4,058,433 | 11/1977 | Fuller et al. | 210/758 X |
| 4,076,621 | 2/1978 | Hardison | 210/758 X |
| 4,123,355 | 10/1978 | Frosch et al. | 210/721 X |
| 4,257,339 | 3/1981 | Prudhon et al. | 110/346 |

*Primary Examiner*—Thomas G. Wyse
*Attorney, Agent, or Firm*—Burns, Doane, Swecker & Mathis

[57] ABSTRACT

Intimate contacting of plural, physically disparate phases, e.g., for the purification of waste waters typically comprising sulfide and polysulfide pollutants, is effected by (i) co-atomizing a first liquid stream which comprises solid waste progenitors together with a second fluid stream inter-reactive therewith, (ii) this co-atomization/reaction being made with and within an entraining stream of a third, gaseous phase.

12 Claims, 5 Drawing Figures

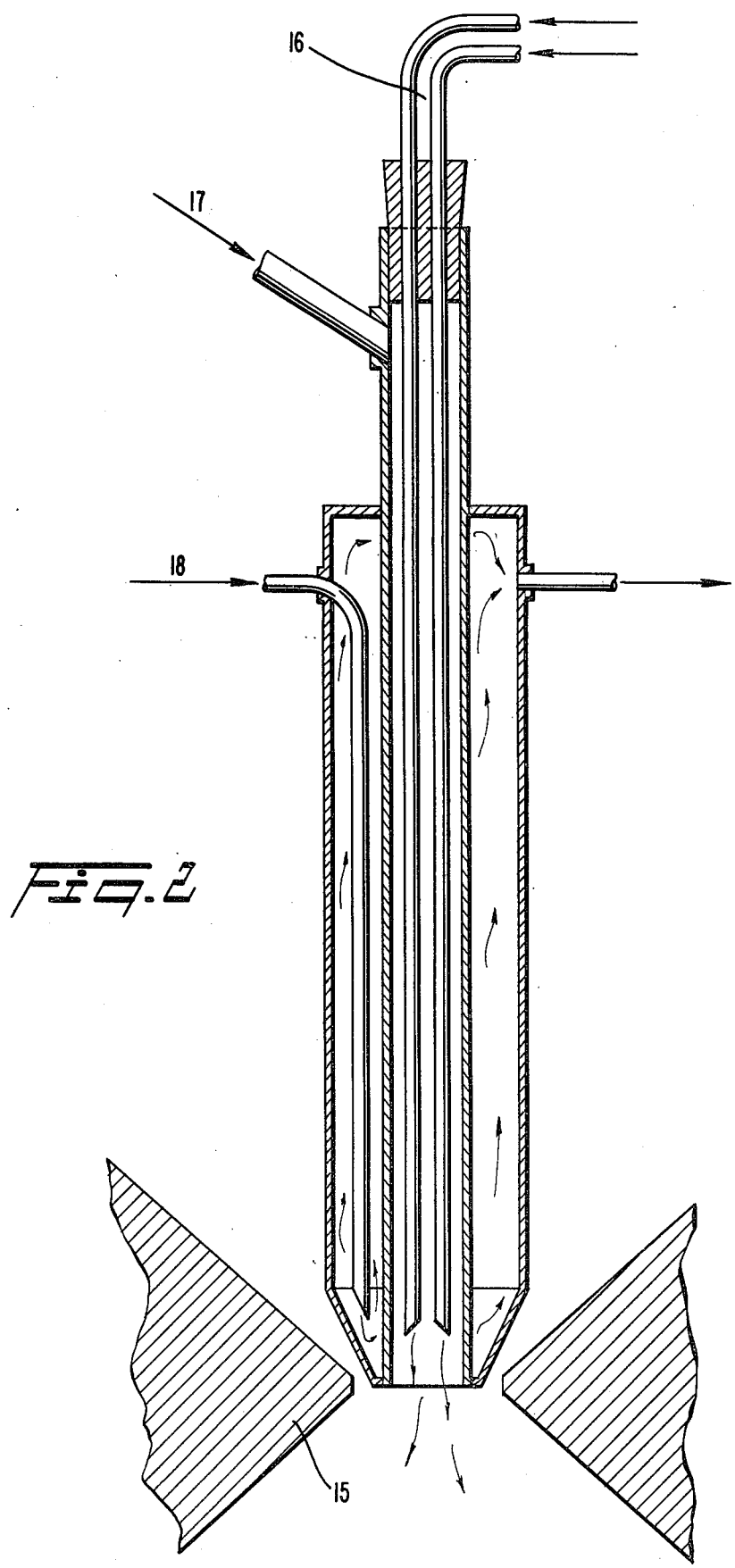

INTIMATE CONTACTING/SEPARATING OF PLURAL PHASES

BACKGROUND OF THE INVENTION

1. Field of the Invention

The present invention relates to the treatment of liquid materials containing compounds or species which are apt to produce solid waste substances, or pollutants, as a result of certain physico/chemical operations being performed thereon, and, more especially, to the treatment of waste waters containing inorganic and/or organic salts, certain of which having low melting points, such as sulfides, sulfates, chlorides, and the like.

2. Description of the Prior Art

It is well known to this art that the purification of waste waters is both difficult and complex, and, accordingly, the state of the art is replete with various proposed solutions to this problem.

Thus, physico/chemical methods have been proposed, such as those featured in French Pat. No. 2,320,268. Same are characterized in that the waste water, adjusted to a pH below 7 and having a temperature ranging from 20° to 200° C., is contacted with pure technical oxygen at a pressure ranging from normal pressure to 20 bars, until the sulfide therein is converted into thiosulfates; then the thiosulfates are converted to sulfates with technical oxygen, at a pH of from 0 to 5, or from 0 to 8 in the case of waste water containing only sulfates, at temperatures from 20° to 200° C., at pressures of up to 20 bars, and optionally in the presence of suitable catalysts.

However, the mere characterization of such a process bares its complexity. French Pat. No. 2,306,610, therefore, proposes to alternatively subject the water to simultaneous spraying conjointly with an oxidizing heat treatment. In this particular process, contacting and treatment may be carried out in a reactor/contactor as described in French Pat. No. 2,257,326 [corresponding to Prudhon et al application Ser. No. 916,477, filed June 19, 1978, abandoned, a continuation of Ser. No. 770,802, filed Apr. 19, 1977 (now abandoned), itself a continuation of Ser. No. 479,774, filed June 17, 1974 (also abandoned)], according to which at least one fluid is charged into the depression zone of a helical flow of a second fluid travelling under much greater momentum.

This method, nonetheless, has not proved sufficiently reliable industrially for this particular purpose, in view of the possible variation in the concentration of sulfur derivatives found in the process effluent.

Deposits too have been found to form in the collecting vessel.

This difficulty is thought to be due particularly to the presence of polysulfides. Though these have been known for a long time, having been described by Scheele as early as 1777, same generally reflect the presence of a mixture of constituents. Serious need therefore exists in this art for a treatment which can eliminate these objectionable compounds and possibly yet others. Also compare U.S. Pat. Nos. 3,758,081, 4,086,099, 4,124,353, 4,257,339, 4,263,234, 4,265,702 and 4,267,131, assigned to the assignee hereof and hereby expressly incorporated by reference.

SUMMARY OF THE INVENTION

Accordingly, a major object of the present invention is the provision of an improved process for purifying contaminated liquid streams, which process featuring the treatment of one fluid phase with a different reactive fluid phase, and thence conducting a second treatment with at least one gas phase upon the product of such first treatment, with the subject process being characterized in that the treatment with the reactive phase is carried out, immediately before the second treatment by co-atomization with the gaseous phase, i.e., advantageously within a period of less than one second.

And except as otherwise indicated herein, the various parameters of the subject process/apparatus are as set forth in said application Ser. No. 916,477, and in the U.S. Pat. Nos. 4,257,339 and 4,267,131, for example.

BRIEF DESCRIPTION OF THE DRAWINGS

FIG. 2 is an axial, diagrammatical cross-sectional view of one embodiment of the fluid inlet/contacting means according to the invention;

DETAILED DESCRIPTION OF THE INVENTION

Figure 1:
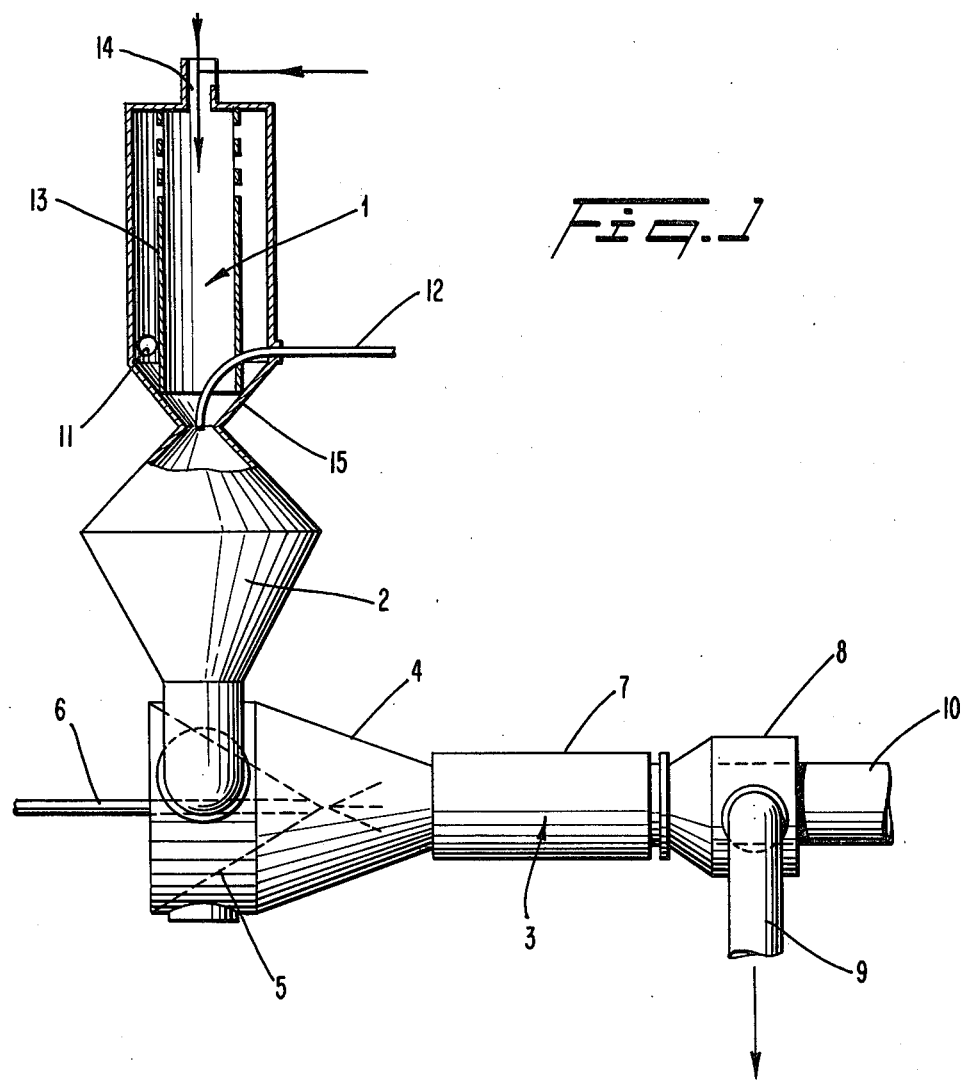
FIG. 1 is a schematic/diagrammatic representation of apparatus suitable for carrying out the treatment according to the invention.

More particularly according to this invention, the gas phase is advantageously supplied in the form of descending helical flow, and the liquid to be treated and the reactive solution are co-atomized along the longitudinal axis of said helical flow, in a zone of depression; cf. said copending application, Ser. No. 916,477.

In those instances where the liquor to be treated comprises water and particularly organic and inorganic sulfides and polysulfides, possible with other constituents, such as sodium chloride, trace amounts of oils, alcohols and other organic derivatives, or species, the reactive liquid phase advantageously is hydrochloric acid.

It is then surprisingly found that, not only does co-atomization take place satisfactorily, although it would have been expected that at least some undesirable compounds would be formed, but also that, after treatment by the gaseous phase, a thoroughly dried powder is obtained, which powder can then be separated by conventional means.

The invention thus reflects a departure from the typical practice of departing, if possible, from set reaction conditions in order to attain the best conditions for atomization.

The invention also provides an unexpected and unpredictable means of monitoring the kinetics of reactions in such a medium, even though the reactions themselves have long been known to the art.

Obviously, the flow rate and temperature conditions depend upon the nature of the solutions to be treated, and upon the reactive liquor utilized to treat them.

In the case of treatment for pollution abatement the gaesous phase is brought to a high temperature, preferably on the order of 600° to 1200° C., before it is contacted with the liquid phase. The two solutions constituting the liquid phase, on the other hand, may be at a relatively low temperature, e.g., room temperature.

As heretofore mentioned, in the case of a liquor containing sulfides and polysulfides, the reactive liquor employed for the treatment thereof consists of an acid solution, such as hydrochloric acid, with the result that the pH of the liquid phase is adjusted to approximately 9.

In the case of a high temperature treatment, suitable method and apparatus are described in published French patent application No. 2,431,321.

A first axially summetrical, descending helical flow serves to define a hot gas generator. But instead of the hot gas being tangentially charged at the periphery as the gas phase of a helical feedstream, the liquid phase is introduced along the longitudinal axis of the helical flow exiting the hot gas generator.

In large scale, large output installations, moreover, it is also recommended to feed the liquid phase in predispersed form, as in our French patent application No. 80/17960, particularly by imparting to same a conical or frustoconical shape. The rotating or helical movement imparted to one of the liquid phases may advantageously be used to form the predispersion and mixing.

In order to further illustrate the present invention and the advantages thereof, the following specific example is given, it being understood that same is intended only as illustrative and in nowise limitative.

EXAMPLE

Referring to the several figures of drawing, in FIG. 1 there is illustrated apparatus which comprises a combustion chamber 1, a biconical contactor 2, dust separating means 3 including a jacket 4, in which a receiving cone 5 is arranged just outside the biconical member 2, and optionally a liquid feed supply line 6. The frustoconical jacket 4 is extended by a cylinder 7, which enables the rotating or helical movement to be maintained and which conveys the products of reaction to a centrifugal separator 8. The solid product exits the apparatus at 9 and the gas at 10, where it may be fed to a washing tower (not shown).

With specific respect to the preferred embodiment of the invention, the treatment performed upon the liquor to be treated is effected by first establishing a vertically descending helical flow by means of a fluid which is introduced tangentially at 11; such flow is axially extending and axially symmetrical upon passing through the perforated cylinder 13. A fuel introduced through the pipe 14 enables combustion to be carried out within the combustion chamber 1. A double pipe 12 enables the liquid phase to be introduced into the system.

The hot gas generator or combustion chamber shown diagrammatically in FIG. 1 terminates distally in a frustoconical section 15. FIG. 2 illustrates diagrammatically how the respective fluids are introduced into the system and interreacted/contacted.

The two axial feed conduits 16 and 17 respectively supply the reactive liquid, HCl, and the liquid to be treated. Under certain circumstances a cooling circuit 18 including circulating coolant is provided. The feed tubes 16, 17 and 18 are illustrated as terminating, or opening, substantially at the level of the smallest section of the frustoconical member 15.

Figure 3:
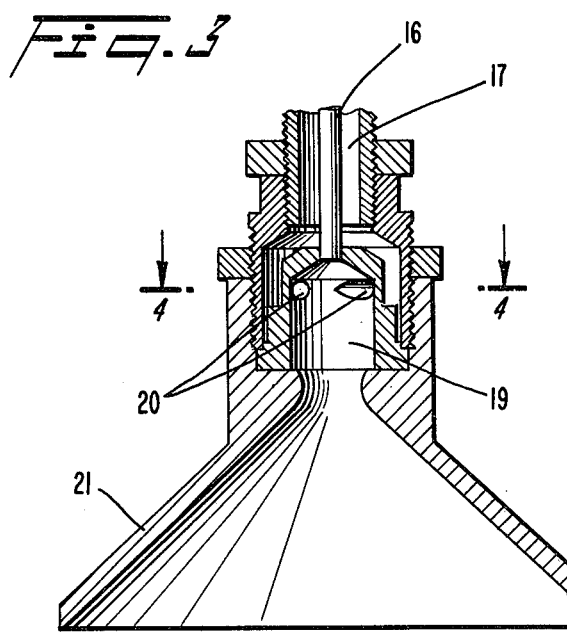
FIG. 3 is an axial, diagrammatical cross-sectional view of another embodiment of the fluid inlet/contacting means according to the invention.
Figure 4:
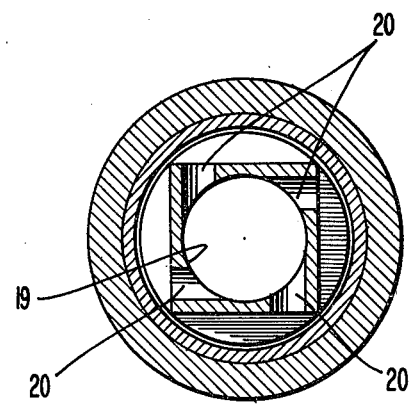
FIG. 4 is a cross-sectional view taken along the line 4-4' of FIG. 3.

In another embodiment, particularly adapted to large scale apparatus, the two liquid solutions are predispersed and intimately admixed before being passed into the de-pressure zone of the flow from the hot gas generator. This embodiment is illustrated in FIGS. 3 and 4. Here the HCl solution is introduced axially into a chamber 19, into which the solution to be treated is tangentially charged; through the apertures 20; the mixture is then conveyed into a frustoconical vessel 21.

Figure 5:
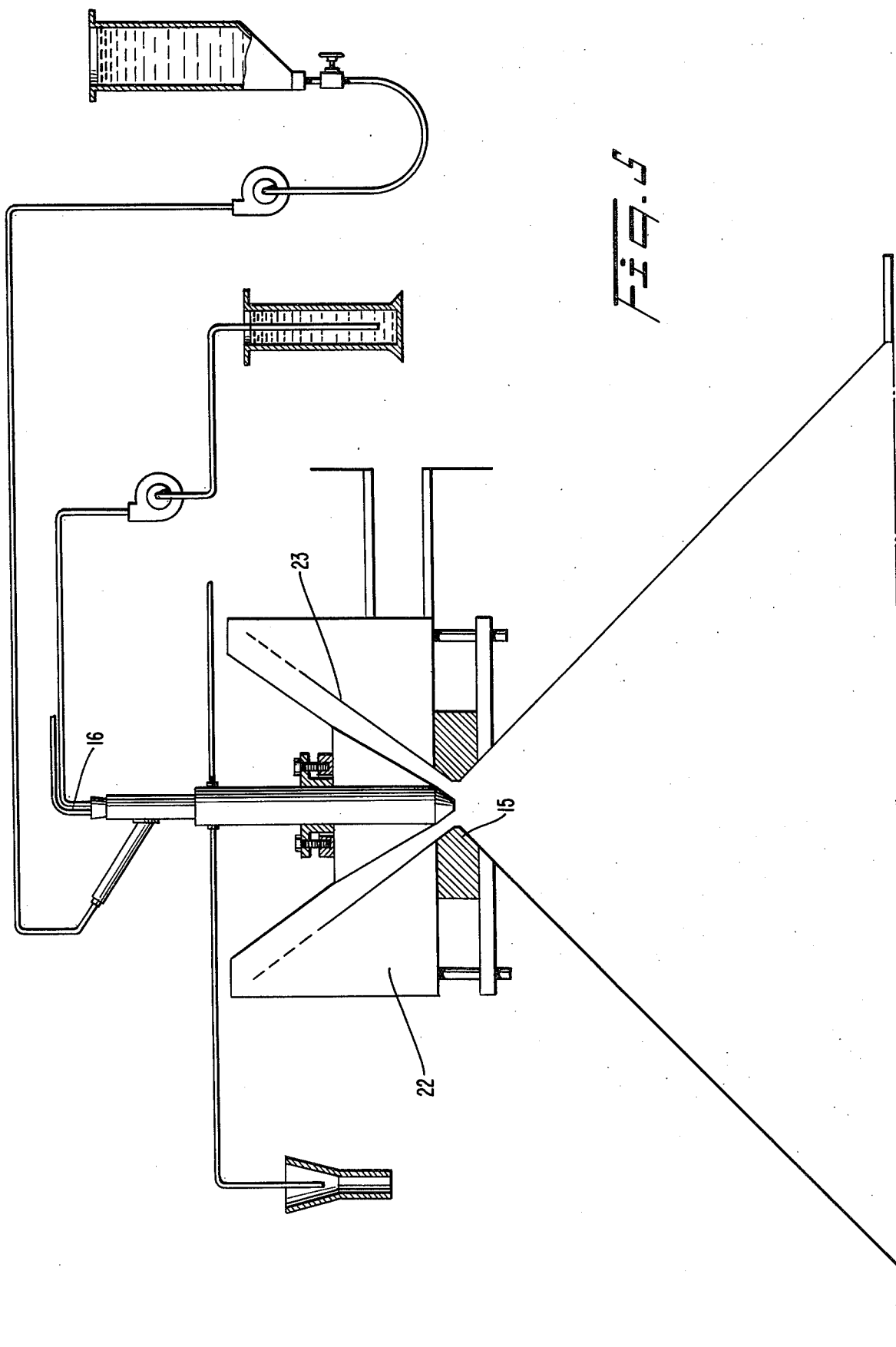
FIG. 5 is a schematic/diagrammatic representation of yet another embodiment of the fluid inlet/contacting means according to the invention.

Finally, in another embodiment (FIG. 5) a single head 22 is used, including a perforated frustoconical chimney 23 and a fluid supply means as shown in FIG. 2.

In the specific embodiment which follows, an apparatus as depicted in FIGS. 1, 3 and 4 was employed.

The combustion zone 1 had a capacity of 20,000 kg/h of air.

The solutions to be treated contained:
(i) Water;
(ii) Organic and inorganic sulfides and polysulfides;
(iii) NaCl; and
(iv) Trace amounts of organic materials, such as oils and alcohols.

The proportion of dry solids, dried at 110° C. (at constant weight) was approximately 30%.

The reactant supplied in liquid form consisted of hydrochloric acid, which was co-atomized with the solution to be treated, such as to lower the pH of the solution.

The other conditions were as follows:

Pressures utilized
- $P_1$ relative = pressure at burner = 720 g/cm2 $\simeq 0.7\ 10^5$ Pa relative
- $P_2$ = air pressure at inlet of generator 280 mm of Hg, i.e., $0.4\ 10^5$ Pa
- $P_3$ = pressure on sulfurous water = $0.6\ 10^5$ Pa
- $P_4$ = HCl pressure = $10^5$ Pa Flow rate of sulfurous water ~4,000 kg/h
Flow rate of HCl ~200 kg/h of 33% by weight solution
$T_1$ = temperature at generator ~850° C.
$T_2$ = temperature at biconical vessel ~450° C.

A white powder was collected at the outlet of the apparatus which had, substantially, the following composition:
(1) 90% NaCl
(2) 10% sulfate and traces of sulfite No adhesion whatsoever to the walls of the biconical vessel was noted, although, all other things being equal, there would be a deposit of materials on the walls of the vessel if the co-atomization according to the invention were not carried out.

The above example, not intended to impose any limits on the invention, is a perfect illustration of the significance thereof. The invention meets the dual need for both non-pollution and economy in energy, and does so unexpectedly, in that it represents a marked departure from the state of the art in solving this type of problem.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification of a liquid stream containing waste materials while inhibiting the formation of deposits on the wall of a treatment vessel, comprising the steps of:

establishing a vertically descending current of axially extending, axially symmetrical helical flow of a gaseous phase in said treatment vessel;

contacting said liquid stream with a second fluid stream of a reactive material which operates on the waste materials in said liquid stream to produce solid waste substances; and immediately following said contacting, injecting the combined liquid and fluid streams into said helical flow, downwardly along the longitudinal axis thereof, to co-atomize the liquid and fluid stream with the gaseous phase and thereby inhibit the deposit of solid waste substances or reactants on the walls of said treatment vessel.

2. The process as defined by claim 1, said second stream being a liquid stream and said immediate co-atomization (ii) being effected within about one second after said contacting.

3. The process as defined by claim 1, said injection (iii) being at a zone of restricted flow passage with respect to said helical flow.

4. The process as defined by claim 3, further comprising phase separating the product of said steps (i), (ii) and (iii).

5. The process as defined by claim 4, further comprising recovering a dried powder product.

6. The process as defined by claim 1, said first liquid stream being a waste water.

7. The process as defined by claim 6, said waste water comprising organic and inorganic sulfide and polysulfide pollutants.

8. The process as defined by claim 1, said first and second feedstreams being pre-dispersed.

9. A process for the purification of a stream of waste water containing orgnic and inorganic sulfide and polysulfide pollutants, comprising the steps of:

establishing a vertically descending current of axially extending, axially symmetrical helical flow of a gaseous phase;

contacting said waste water stream with a stream comprising a solution of hydrochloric acid, and thence immediately injecting said liquids for co-atomization/reaction into said helical flow of gaseous phase, downwardly along the longitudinal axis thereof.

10. The process as defined by claim 9, said gaseous phase having a temperature of from 600° to 1200° C.

11. The process as defined by claim 10, said first and second liquid streams being at ambient temperature.

12. The process as defined by claim 10, said gaseous phase being hot gas.

* * * * *